(12) United States Patent
Niwa et al.

(10) Patent No.: US 6,842,523 B1
(45) Date of Patent: Jan. 11, 2005

(54) ENCRYPTION APPARATUS, CRYPTOGRAPHIC COMMUNICATION SYSTEM, KEY RECOVERY SYSTEM, AND STORAGE MEDIUM

(75) Inventors: Akito Niwa, Yokohama (JP); Shinichi Kawamura, Kodaira (JP); Megumi Aoki, Inagi (JP); Toshiaki Saisho, Tokyo (JP); Tatsuya Ishihara, Yokohama (JP); Fumihiko Sano, Fuchu (JP); Satomi Hori, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/448,470

(22) Filed: Nov. 24, 1999

(30) Foreign Application Priority Data

Nov. 25, 1998 (JP) .......................................... 10-334485

(51) Int. Cl.[7] ................................................. H04L 9/00
(52) U.S. Cl. ...................... 380/286; 380/278; 380/279; 713/155; 713/156; 713/157; 713/171
(58) Field of Search .................................. 380/278, 279, 380/286; 713/155, 156, 157, 171

(56) References Cited

U.S. PATENT DOCUMENTS

| 5,276,737 A | * | 1/1994 | Micali ........................ 380/30 |
| 5,315,658 A | * | 5/1994 | Micali ........................ 380/286 |
| 5,557,346 A | | 9/1996 | Lipner et al. |
| 5,557,765 A | | 9/1996 | Lipner et al. |
| 5,640,454 A | | 6/1997 | Lipner et al. |
| 5,796,830 A | * | 8/1998 | Johnson et al. ............. 380/286 |
| 5,815,573 A | * | 9/1998 | Johnson et al. ............. 380/286 |
| 5,907,618 A | * | 5/1999 | Gennaro et al. ............ 380/286 |
| 5,937,066 A | * | 8/1999 | Gennaro et al. ............ 380/286 |
| 6,052,469 A | * | 4/2000 | Johnson et al. ............. 380/286 |
| 6,058,188 A | * | 5/2000 | Chandersekaran et al. .. 380/286 |
| 6,249,585 B1 | * | 6/2001 | McGrew et al. ............ 380/286 |
| 6,335,972 B1 | * | 1/2002 | Chandersekaran et al. .. 380/286 |

FOREIGN PATENT DOCUMENTS

JP 8-506217 7/1996

* cited by examiner

Primary Examiner—Gilberto Barrón
Assistant Examiner—Kambiz Zand
(74) Attorney, Agent, or Firm—Finnegan, Henderson, Farabow, Garrett & Dunner, L.L.P.

(57) ABSTRACT

In an encryption apparatus for encrypting a data body to contain an encrypted data body in transmission data and transmitting the transmission data to a receiver, the transmission data includes sender's key recovery data obtained by encrypting recovery information for recovering a key for decrypting the encrypted data body to allow a key recovery agent registered by a sender to decrypt the recovery information, and receiver's key recovery data obtained by encrypting the recovery information for recovering the key for decrypting the encrypted data body to allow a key recovery agent registered by a receiver to decrypt the recovery information.

6 Claims, 8 Drawing Sheets

REGISTERED INFORMATION TABLE 21

| ID OF USER, APPROVER, AND KEY RECOVERY AGENT (22) | PUBLIC KEY WITH SIGNATURE OF CERTIFICATE AUTHORITY (23) | AGENT LIST REGISTERED BY USER (24) |
|---|---|---|
| USER #1<br>USER #2<br>⋮ | ○○○○<br>××××<br>⋮ | A,B,C,<br>B,D,G,H<br>⋮ |
| APPROVER α<br>APPROVER β<br>⋮ | △△△△<br>□□□□<br>⋮ | NONE<br>NONE<br>⋮ |
| AGENT A<br>AGENT B<br>⋮ | ****<br>▽▽▽▽<br>⋮ | NONE<br>NONE<br>⋮ |

FIG. 5

RECEPTION/TRANSMISSION OF CIPHER MESSAGE

START

CAUSE SENDER TO INQUIRE OF CERTIFICATE AUTHORITY RECEIVER'S PUBLIC KEY AND AGENT LIST — v1

ALLOW SENDER TO RECEIVE PUBLIC KEY CERTIFICATE AND LIST CERTIFICATE FROM CERTIFICATE AUTHORITY — v2

PREPARE AND ENCRYPT TRANSMISSION MESSAGE — v3

TRANSMIT CIPHER MESSAGE — v4

ALLOW RECEIVER TO RECEIVE MESSAGE AND DECRYPT RECEIVED MESSAGE — v5

END

ENCRYPTION APPARATUS, CRYPTOGRAPHIC COMMUNICATION SYSTEM, KEY RECOVERY SYSTEM, AND STORAGE MEDIUM

BACKGROUND OF THE INVENTION

This application is based on Japanese Patent Application No. 10-334485, filed Nov. 25, 1998, the contents of which is incorporated herein by reference.

The present invention relates to an encryption apparatus, cryptographic communication system, key recovery system, and storage medium, all of which are characterized by a section for managing encryption and decryption keys used in encryption and decryption processes.

In recent years, data have been encrypted to prevent wire tapping and alteration in communicating data (messages) on an open network.

Encryption keys are used for this data encryption. Users may lose their own keys, or keys may be destroyed due to some reason. An authorized third party must intercept data depending on situations. To cope with these situations, keys must be recovered by any method.

According to the conventional key recovery system, an authentic user for cryptographic communication registers a key recovery process in an actual key recovery agent in advance, and a key recovery field which allows decryption in correspondence with this registration is added to the encrypted data. The encrypted key recovery field is decrypted to recover the corresponding key (e.g., a secret key for communication).

A sender/receiver or an authorized third party transmits a key recovery field to a key recovery agent, as needed, and makes the agent recover a key such as a lost key.

In the conventional key recovery method, however, it is difficult for the key recovery agent to check if the key recovery requester has the authorized right. The key recovery agent may cooperate with a malicious third party to illegally recover the key. The conventional method cannot prevent this illegal recovery.

Assume that the sender and receiver in data communication register different key recovery agents, and particularly in international cryptographic communication. The key recovery field of the sender cannot be recovered by the key recovery agent registered by the receiver or authentic third party. For example, the sender registers a key recovery agent A, and the receiver registers a key recovery agent B. Assume that the receiver does not know the key recovery agent A and that the receiver loses the secret key for cryptographic communication. In this case, the lost public key cannot be recovered even if the key recovery field of the encrypted data is sent to the key recovery agent B. If the sender and receiver have different nationalities, it is not easy for the receiver to know the location of the key recovery agent A. This also applies to the authentic third party.

BRIEF SUMMARY OF THE INVENTION

An object of the present invention is to provide a cryptographic communication system and key recovery system capable of preventing concentration of rights pertaining to key decryption and conspiracy of agents to make it possible to improve the safety in key recovery.

Another object of the present invention is to provide an encryption apparatus, cryptographic communication system, key recovery system, and storage medium, all of which allow each user or authorized third party to easily acquire agent information and recover keys even if users who register different agents perform cryptographic communications.

According to a first aspect of the present invention, an encryption apparatus, comprises: means for encrypting a data body; and means for transmitting transmission data to a receiver, the transmission data including: the encrypted data body; sender's key recovery data obtained by encrypting recovery information for recovering a key for decrypting the encrypted data body to allow a key recovery agent registered by a sender to decrypt the recovery information; and receiver's key recovery data obtained by encrypting the recovery information for recovering the key for decrypting the encrypted data body to allow a key recovery agent registered by a receiver to decrypt the recovery information.

According to a second aspect of the present invention, a cryptographic communication system comprises: an encryption apparatus, comprising: means for encrypting a data body; and means for transmitting transmission data to a receiver, the transmission data including: the encrypted data body; sender's key recovery data obtained by encrypting recovery information for recovering a key for decrypting the encrypted data body to allow a key recovery agent registered by a sender to decrypt the recovery information; and receiver's key recovery data obtained by encrypting the recovery information for recovering the key for decrypting the encrypted data body to allow a key recovery agent registered by a receiver to decrypt the recovery information; and a plurality of key recovery agents each, when registered by sender or receiver, capable of decrypting sender's or receiver's key comprised of a plurality of key pieces obtained by dividing the key into pieces.

According to a third aspect of the present invention, a key recovery system comprising: an encryption apparatus using key information for encrypting or decrypting data and storing, independently of key information, recovery information for recovering key information in an encrypted state so as to be decrypted by a key recovery agent registered by the encryption apparatus; an approver apparatus for approving a party-who requests a registration approval for the key recovery agent and giving an authorized party who requests an approval for decrypting the encrypted recovery information an approval for decrypting the encrypted recovery information; and a key decrypter apparatus for decrypting and sending back the encrypted recovery information only when a decryption request is made by a party approved by an approver.

The present invention allows recovery of all kinds of key information, can prevent concentration of rights pertaining to key decryption and conspiracy between the key recovery agent and malicious third party, and can improve the safety in key recovery.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below; serve to explain the principles of the invention.

DETAILED DESCRIPTION OF THE INVENTION

A preferred embodiment of the present invention will now be described.

In the following description, "key piece" implies shared key data; "key decryption" implies to decrypt an encrypted key piece; and "key recovery" implies to decrypt individual key pieces to obtain a key before sharing.

Figure 1:
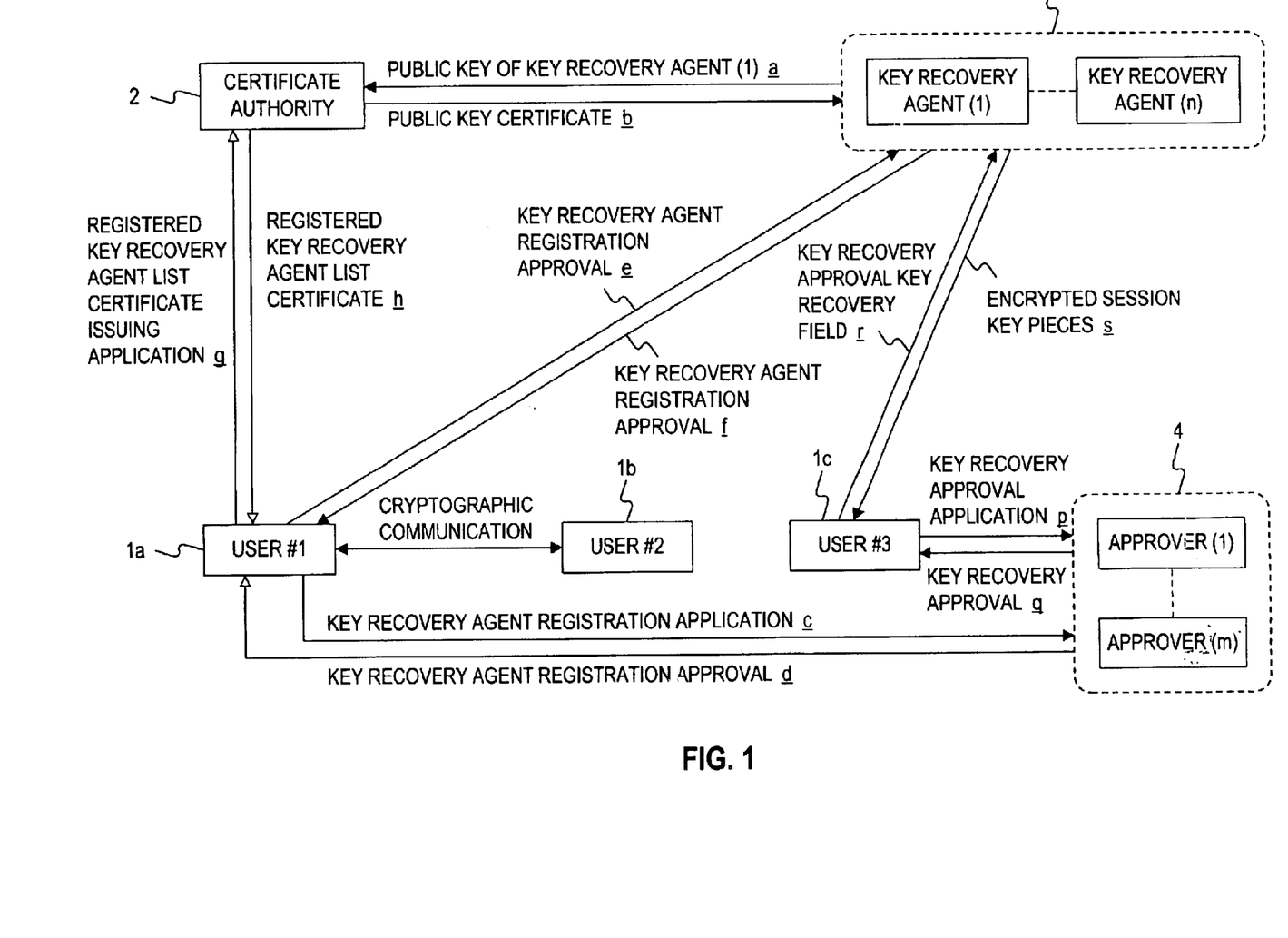
FIG. 1 is a block diagram showing the overall configuration of a cryptographic communication system according to an embodiment of the present invention.

FIG. 1 is a block diagram showing the overall configuration of a cryptographic communication system according to an embodiment of the present invention.

This cryptographic communication system comprises a key recovery agent 3, certificate authority 2, and approver 4 to allow recovering a session key or user's private key in cryptographic communications between users 1a and 1b. The users 1a, 1b, and 1c, key recovery agent 3, certificate authority 2, and approver 4 can communicate with each other via a network (e.g., the Internet) made up of a public network.

Figure 2:
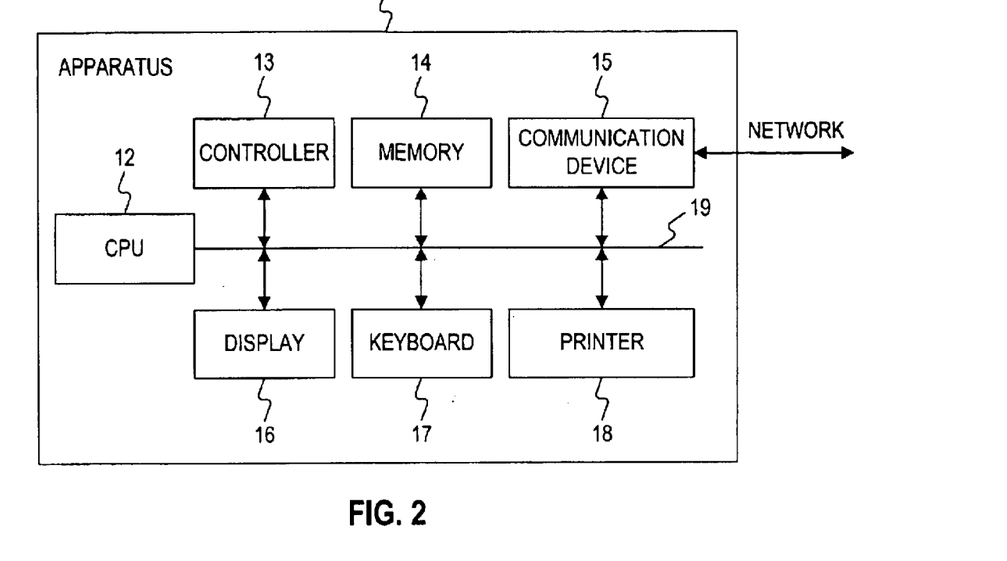
FIG. 2 is a block diagram showing the hardware arrangement of an apparatus constructing a user, recovery agent, and certificate authority or approver.

FIG. 2 is a block diagram showing the hardware arrangement of an apparatus constructing the users 1a. 1b, and 1c, key recovery agent 3, certificate authority (key recovery center) 2, or approver 4.

An apparatus 11 made up of the users 1a, 1b, and 1c, key recovery agent 3, certificate authority 2, and approver 4 has a hardware computer system made up of a CPU 12, controller 13, memory 14, communication device 15, display 16, keyboard 17, printer 18, and data bus 19.

Of these components, the memory 14 includes both a so-called main memory (e.g., a RAM) and a secondary memory (e.g., a hard disk). The functions to be performed by users 1a, 1b, and 1c, key recovery agent 3, the certificate authority 2, or approver 4 are implemented by programs loaded on the main memory and control of the CPU 12 based on these programs. More specifically, the 1 users 1a, 1b, and 1c, key recovery agent 3, the certificate authority 2 and approver 4 have different software arrangements. The detailed contents of the functions performed by a combination of hardware and software will be described later with reference to the operational descriptions and flow charts.

A communication message, various certificates, public key, various information lists, and the like are stored in part of the second memory of the memory 14 in correspondence with the users 1a, 1b, and 1c, key recovery agent 3, certificate authority 2 and approver 4, respectively. The storage data is used to perform the respective functions.

The users 1a, 1b, and 1c, key recovery agent 3, certificate authority 2, or approver 4 will be described below.

In FIG 1, the user 1a represents a sender who sends a cipher message (cryptographic communication), the user 1b represents a receiver who receives the cipher message, and the user 1c represents an authentic third party who intercepts the encrypted message. The users 1a, 1b, and 1c have all functions necessary for the sender, receiver, and authorized third party and selectively serve as one of them depending on the situation.

More specifically, the user 1 users 1a, 1b, and 1c have their has his own public and private keys, and have a function of registering the key recovery agent 3 cipher message preparation function, message transmission/reception function, cipher message decryption function, and key recovery request/recovery function. Note that the apparatus 11 in FIG. 2 constructs the encryption apparatus of the user 1 users 1a, 1b, and 1c.

The key recovery agent 3 has its own public and private keys, and decrypts the received key recovery field with its own private key in response to a request from the registered users 1a, 1b, or 1c and sends back the decrypted recovery field. In doing these processes, the key recovery agent 3 checks the registration signature of the approver 4. There can be a large number of key recovery agents 3. When a given key recovery agent is registered in the certificate authority 2, this agent serves as the key recovery agent 3 in this embodiment. Key recovery agents 3 (#1) through 3 (#n) are available in this embodiment.

The certificate authority 2 has its own public a private keys and gives signatures (certificate) to each users 1a, 1b, or 1c, key recovery agent 3, and approver 4 to issue various certificates. The certificate authority 2 discloses these pieces of information to the user 1 and the like.

The approver 4 issues an approval to the users 1a, 1b, or 1c when one of users 1a, 1b, or 1c performs registration in the key recovery agent and makes a key recovery request. There can be a large number of approvers 4. Approvers 4 (#1) through 4 (#n) are available in this embodiment. The users 1a, 1b, or 1c can receive one approval from a plurality of approvers 4. In this case, a representative approver is given.

The operation of the cryptographic communication system and encryption apparatus in this embodiment having the above arrangements will be described below.

In this cryptographic communication system, a key recovery agent registers its own public key in the In certificate authority. A user who desires key recovery selects an agent for key recovery request from the key recovery agents registered in the certificate authority and registers the selected agent in advance.

After the above preparation, communication is performed between the users. If a transmission session key or user's private key is to be recovered due to the loss of the key or the like, the user requests the registered agent to recover the key.

Registration, communication, and key recovery of the system of this embodiment will be described below.

(Registration Procedure of Key Recovery Agent)

Figure 3:
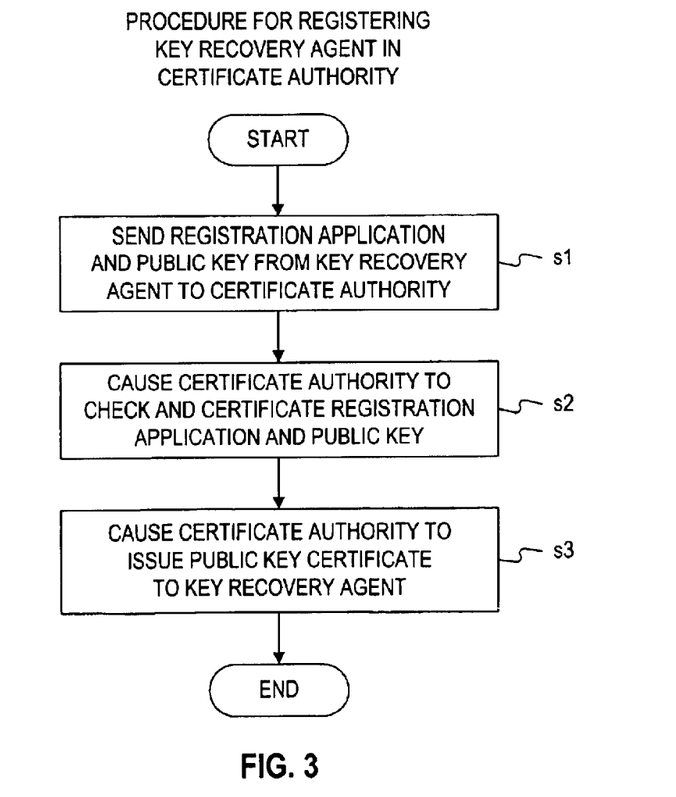
FIG. 3 is a flow chart showing a procedure for registering the key recovery agent in the certificate authority.

FIG. 3 is a flow chart showing a procedure for registering a key recovery agent in the certificate authority.

The key recovery agent 3 which wants to be registered in the certificate authority 2 transmits a registration application including its own signature for its own public and private keys to the certificate authority 2 (s1 in FIG. 3; a in FIG. 1).

The certificate authority 2 checks this key recovery agent 3 and its signature (s2 in FIG. 3) and issues to this key recovery agent 3 a public key certificate 17 in which the signature of the certificate authority is added to the application data including the public key of the key recovery agent 3 (s3 in FIG. 3; b in FIG. 1).

This key recovery agent 3 is registered in the user/approver/key recovery agent registration information table in the certificate authority 2. The contents of this registration information table are disclosed to the users 1a, 1b, and/or 1c. The key recovery agent 3 means the agent registered in the certificate authority 2.

(Registration Procedure of User)

The user 1a who wants to send a message selects a key recovery agent and registers the selected key recovery agent in the certificate authority 2.

Figure 4:
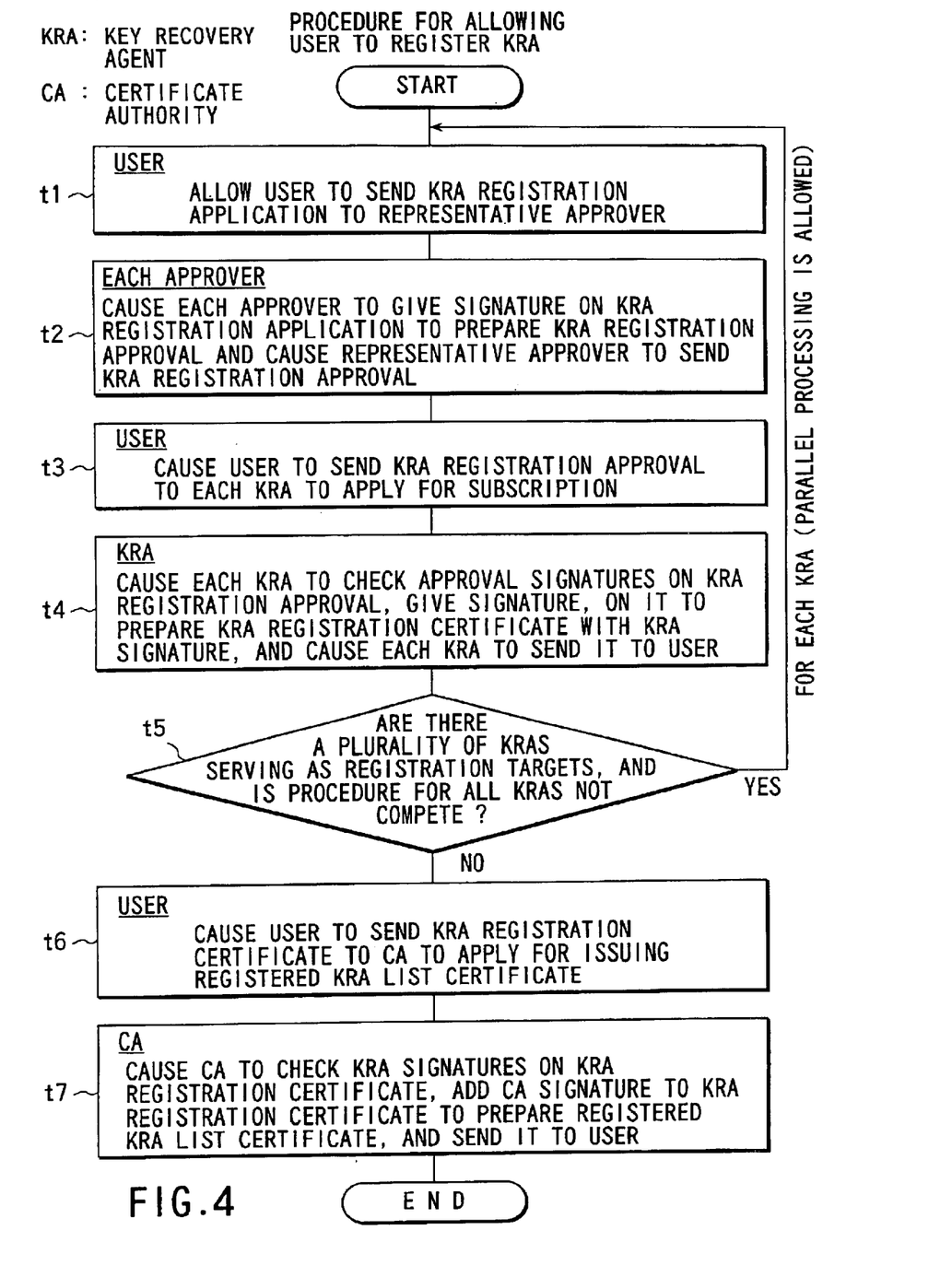
FIG. 4 is a flow chart showing a procedure for allowing the user to register the key recovery agent.

FIG. 4 is a flow chart showing a procedure for allowing the user to register the key recovery agent.

Assume that the user 1a in FIG. 1 registers a key recovery agent.

In subscription to one or a plurality of key recovery agents 3, the user 1a sends a key recovery agent registration application 18 to the approver 4 (t1 in FIG. 4; c in FIG. 1).

The user 1a may request an approval to one approver 4 or approvals to a plurality of approvers 4 in order to improve the safety pertaining to the key recovery. To request approvals to the plurality of approvers 4, the user 1a sends a registration application to only a representative approver. (t1 in FIG. 4).

The representative approver transmits the registration application to each approver 4, and each approver 4 checks the contents of the key recovery agent registration application and gives a signature (e.g., using a multiple signature scheme). The application is finally returned to the representative approver. A key recovery agent registration approval is transmitted from the representative approver to the user 1a (t2 in FIG. 4; d in FIG. 1).

The user 1a sends a subscription application with the key recovery agent registration approval acquired from the approvers 4 to each key recovery agent 3 that the user 1a wants to register (t3 in FIG. 4; e in FIG. 1). Note that the number of key recovery agents that the user 1a wants to register may be one, but the user 1a registers a plurality of key recovery agents 3 in principle.

Upon receiving the registration approval, each key recovery agent 3 checks the signatures of the approvers 4 in the key recovery agent registration approval and adds its own signature to this approval. Each key recovery agent 3 issues a key recovery agent registration certificate to the user 1a (t4 in FIG. 4; f in FIG. 1).

Figure 5:
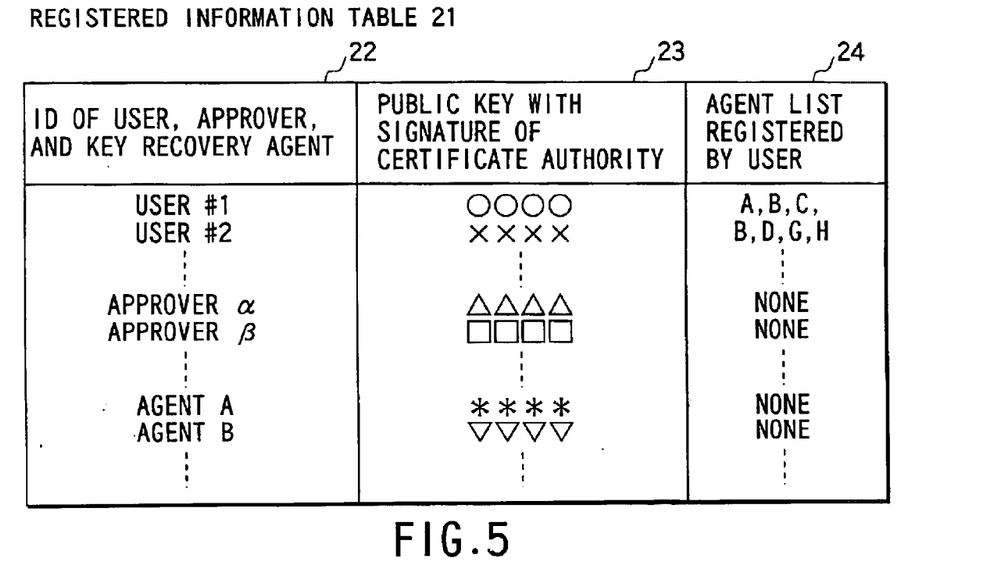
FIG. 5 is a registration information table arranged in the certificate authority.

When the process for acquiring key recovery agent registration certificates from all the key recovery agents 3 is not complete, the processes in steps t1 to t4 are repeated (t5 in FIG. 5).

The user 1a requests the certificate authority 2 to issue a registered key recovery agent list certificate with the key recovery agent registration certificates acquired from the agents 3 (t6 in FIG. 4; g in FIG. 1).

The certificate authority 2 checks the signatures of the key recovery agents 4 on the key recovery agent registration certificates and adds its own signature. The certificate authority 2 issues a registered key recovery agent list certificate to the user 1a (t7 in FIG. 4; h in FIG. 1).

The key recovery agents 3 listed up in this agent list are the registered key recovery agents 3 of the user 1a. The key recovery field of the user 1a can be decrypted using the private keys of these agents 3.

The certificate authority 2 issues the registered key recovery agent list certificate and at the same time reflects the contents of the list on the registration information table described above.

FIG. 5 is a registration information table arranged in the certificate authority.

Referring to FIG. 5, the registration information table 21 has public keys 23 with signatures approved as the public keys of the users 1a, 1b, and 1c, and a user registered agent list 24 in correspondence with user IDs (identification information) 22 of the users 1a, 1b, and 1c, approvers 4, or key recovery agents 3.

The public key 23 with a signature represents that this key is a public key of the users 1a, 1b, or 1c, or the like, which is approved by the certificate authority. This public key 23 is issued to a requester for this information in the form of a public key certificate.

The user registered agent list 24 is formed in correspondence with each registered user. Upon receiving the contents of this list, the third party can know the correspondence between the users 1 and the key recovery agents 3.

The contents of the registration information table 21 are open to the public, and the users 1a, 1b, and 1c or agent 3 can know the table contents as if it finds out a telephone number in a telephone directory. The agent 3 registered in the table 21 registers its own public key in the certificate authority 2. Such a key may be listed on the table 21.

(Transmission/Reception of Cipher Message)

A process for actually exchanging a cipher message between the users 1a and 1b who have registered the agents will be described below. In this case, the user 1a serves as a sender, and the user 1b serves as a receiver. Note that the user 1 (#2) have already registered the agents in the process shown in FIG. 4.

Figure 6:
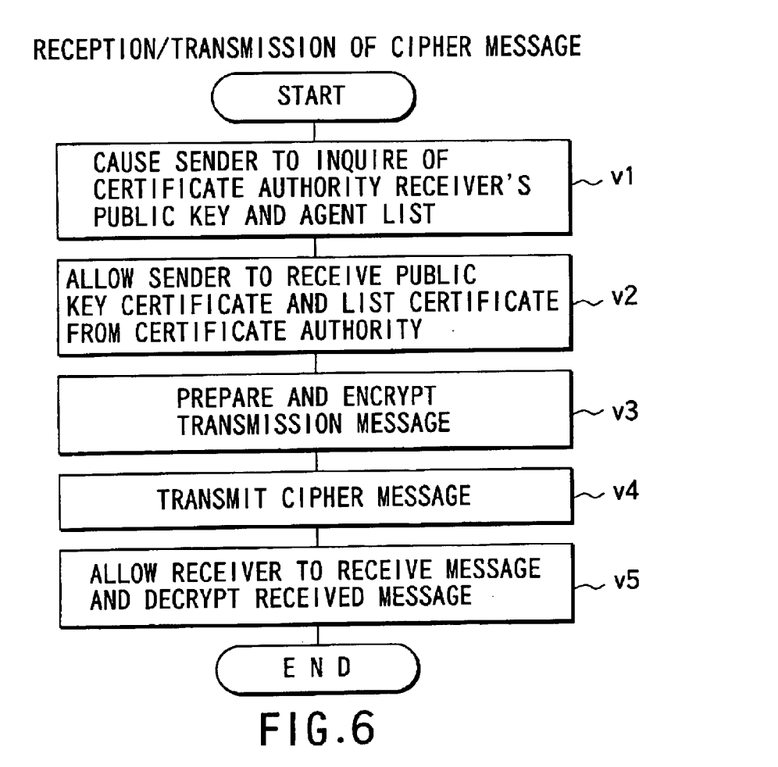
FIG. 6 is a flow chart showing a procedure for transmitting/receiving a cipher message.

FIG. 6 is a flow chart showing a procedure for transmitting/receiving a cipher message.

Figure 7:
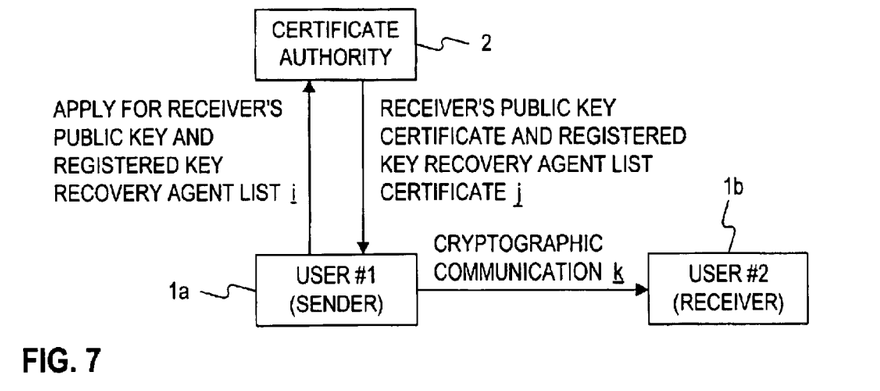
FIG. 7 is a view showing the relationship between the user and certificate authority when exchanging the cipher message.

FIG. 7 is a view showing the relationship between the user and certificate authority in transmitting/receiving a cipher message.

The user 1a serving as a sender (to be simply referred to as a sender hereinafter) inquires of the certificate authority 2 the receiver's public keys and the registered key recovery agent list in order to obtain the information of the key recovery agents 3 (v1 in FIG. 6; i in FIG. 7).

The certificate authority 2 prepares a receiver's public key certificate and registered key recovery agent list certificate from the contents of the registration information table 21 and transmits them to the sender (v2 in FIG. 6; j in FIG. 7). This process corresponds to user's operation for finding out a telephone number in a telephone directory (registration information table 21) prepared in the certificate authority 2.

The sender prepares a transmission message (cipher message) using the registered key recovery agent list certificate of the receiver accessed from the certificate authority 2 (v3 in FIG. 6).

Figure 8:
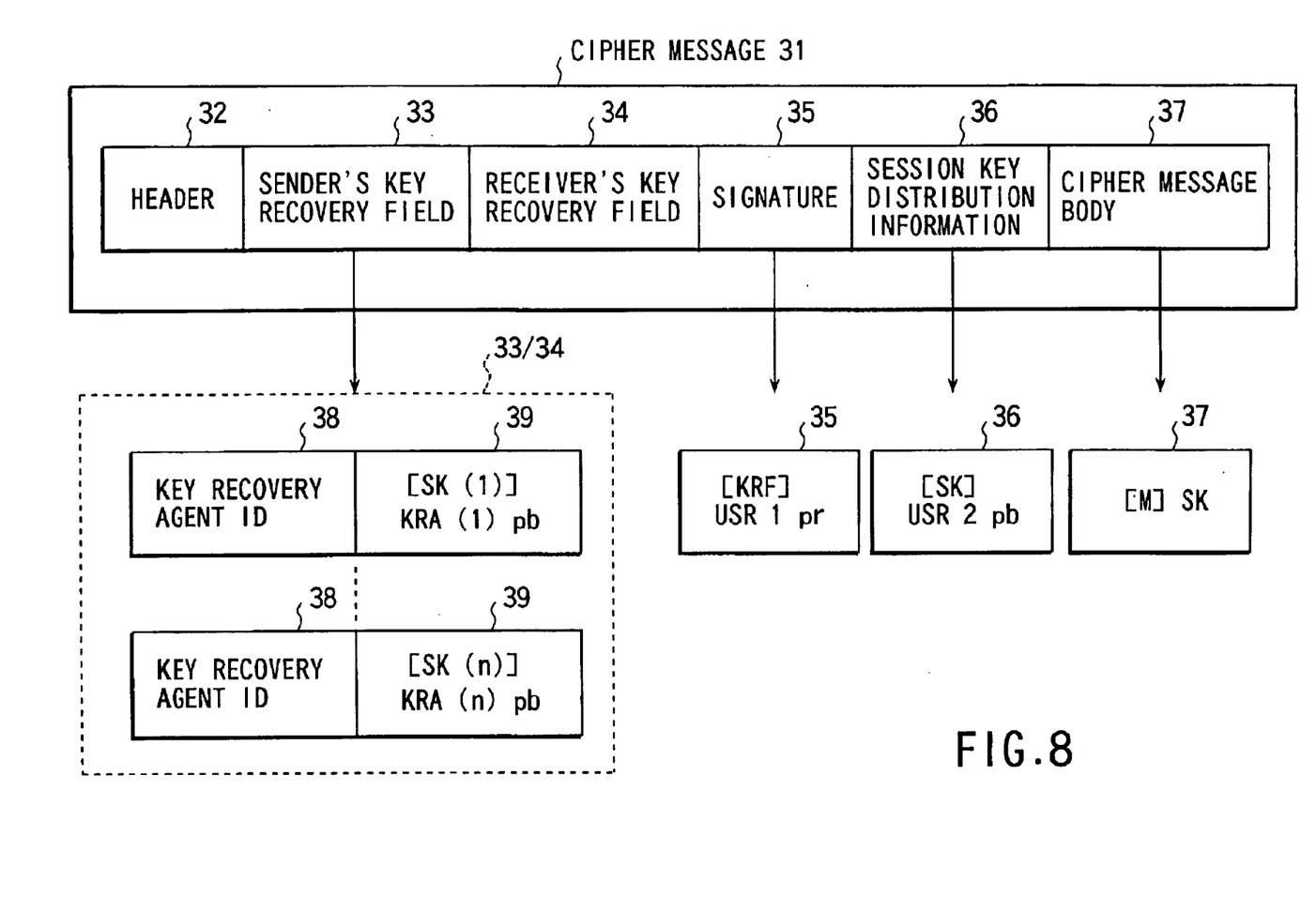
FIG. 8 is a view showing the data structure of a cipher message prepared by a sender.

FIG. 8 is a view showing the data structure of a cipher message prepared by the sender.

This cipher message 31 is made up of a header 32, sender's key recovery field 33, receiver's key recovery field 34, signature 35, session key distribution information 36, and cipher message body 37.

The header 32 stores information such as the size of data following sender's and receiver's key recovery fields.

The sender's key recovery field 33 stores information used when the sender's key recovery agent 3 recovers the key. The receiver's key recovery field 34 stores information used when the receiver's key recovery agent 3 recovers the key. Each of the sender's and receiver's key recovery fields 33 and 34 stores pairs of IDs 38 of the key recovery agents 3 and session key piece [[Ski]KRA(i)pb] data 39 encrypted using the public keys of the key recovery agents 3. The number of pairs of the IDs 38 and data 39 is equal to the number of key recovery agents.

The receiver's agent IDs and agent's public key used to prepare the receiver's key recovery field 34 are obtained from the registered key recovery agent list certificate accessed in step v2.

The signature 35 ([[KRF]USRlpr]) generated using the sender's key [USR1pr] is added to the cipher message 31 in order to prevent alteration of the sender's and receiver's key recovery fields [KRF] 33 and 34.

The session key distribution information 36 stores a session key [[SK]USR2pb] encrypted using the receiver's public key [USR2pb].

The cipher message body 37 ([[M]SK]) encrypted using the session key [SK] is added as the transmission data body to the end of the cipher message 31.

The cipher message 31 constructed as described above is transmitted from the sender 1a to the receiver (user 1b) (v4 in FIG. 6; k in FIG. 7).

Upon receiving the cipher message having the structure shown in FIG. 8, the receiver decrypts the session key information 36 using his own private key to extract the session key. The receiver then decrypts the cipher message body 37 using the extracted session key to extract the transmission data (v5 in FIG. 6).

(Key Recovery Procedure of Session Key)

Decrypting the cipher message normally as in step v5 of FIG. 6 suffers no problem. A recovery process will be described when the user 1a or 1b loses a session key.

Figure 9:
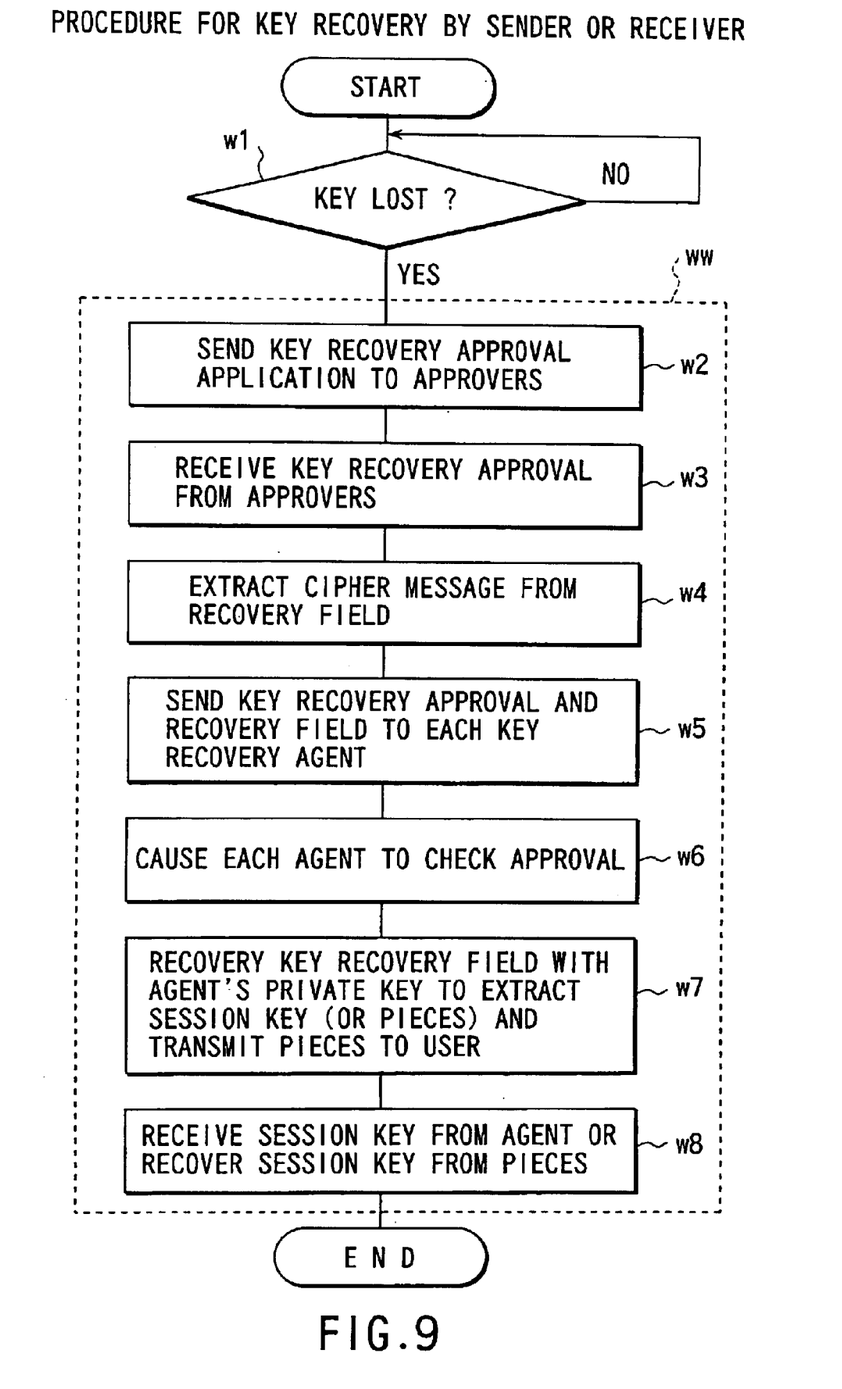
FIG. 9 is a flow chart showing a procedure for recovering a key by a sender or receiver.

FIG. 9 is a flow chart showing a procedure for recovering a key by the sender or receiver.

Figure 10:
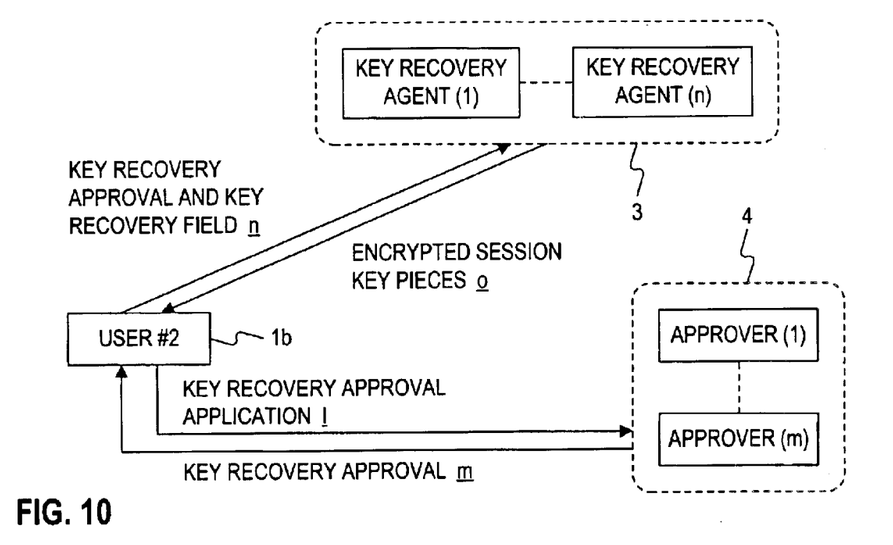
FIG. 10 is a view showing the relationship between the user, key recovery agent, and approver in the procedure for recovering a key by a sender or receiver.

FIG. 10 is a view showing the relationship between the user, key recovery agent, and approver when the sender or receiver recovers the key.

Assume that the user 1a or 1b who requests key recovery has, in advance, information (e.g., an ID) pertaining to the key recovery agent 3 capable of recovering a key recovery field serving as a recovery target. In this case, a user is a message sender (user 1a) or message receiver (user 1b).

The receiver cannot acquire a session key due to some reason and cannot read the cipher message body 37.

When the user 1b loses the session key (w1 in FIG. 9), he sends a key recovery approval application to the approvers 4 (w2 in FIG. 9; 1 in FIG. 10).

The approvers 4 check the key recovery approval application and add signatures (e.g., using a multiple signature scheme). A representative approver sends back a key recovery approval to the user 1#4 1b (w3 in FIG. 9; m in FIG. 10).

The user 1b extracts the key recovery field 33 or 34 from the cipher message 32 and prepares a message to each key recovery agent 3 designated in the extracted key recovery field (w4 in FIG. 9).

Figure 11:
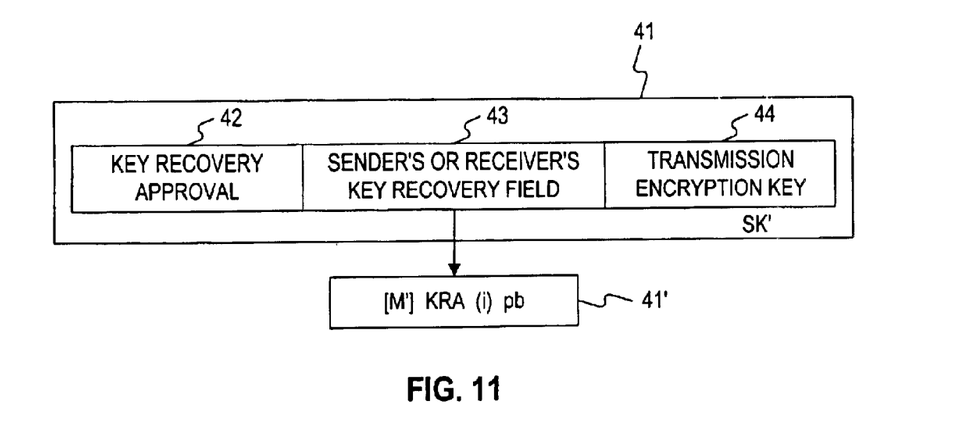
FIG. 11 is a view showing the data structure of a message transmitted from the user to the key recovery agent.

FIG. 11 is a view showing the data structure of the message transmitted from the user to the key recovery agent.

As shown in FIG. 11, a message 41 is obtained such that data [M"] made up of a key recovery approval 42 obtained from the approver 41, the key recovery field 43 extracted from the cipher message 31, and an encryption key 44 used to transmit the recovered session key pieces is encrypted with the public key [KRA(i)pb] of each key recovery agent.

The user 1b transmits the message 41 containing the approval 42 and recovery field 43 to each key recovery agent 3 (w5 in FIG. 9; n in FIG. 10).

The key recovery agent 3 decrypts the encrypted [[M'] KRA(i)pb] 41' with its own private key to extract the key recovery approval, key recovery field, and encryption key [SK']. The key recovery agent 3 then checks the signature of the approver on the key recovery approval 42 (w6 in FIG. 9).

Upon checking the approval 42, the key recovery agent 3 decrypts the key recovery field 43 with its own private key to recover the session key pieces (w7 in FIG. 9). The recovered pieces are encrypted with the encryption key [SK'] and transmitted from the agent 3 to the user 4(#2) 1b (w7 in FIG. 9; or in FIG. 10). The key recovery agent 3 receives a session key from athe agent or it recovers the session key from the pieces (w8 in FIG. 9).

Upon receiving these session key pieces, the user 1b decrypts with the decryption key [SK'] the encrypted session key transmitted from each key recovery agent 3. The user 1b then recovers the original session pieces using, e.g., a Langragean interpolation polynomial on the basis of the decrypted session key pieces (w7 in FIG. 9).

The Lagrange interpolation formula is used to allow recovering the session key if a predetermined number of pieces of a plurality of pieces are recovered. That is, when the key is expanded into key pieces using the Lagrange interpolation formula, the key can be recovered using a predetermined number of pieces (k) ($\leq$n) of the n key pieces.

Operation will be described when a user who requests key recovery does not have information (e.g., an ID) pertaining to the key recovery agent 3 capable of recovering a key recovery field serving as a recovery target. In this case, a user may be an authentic third party (user 1c).

Figure 12:
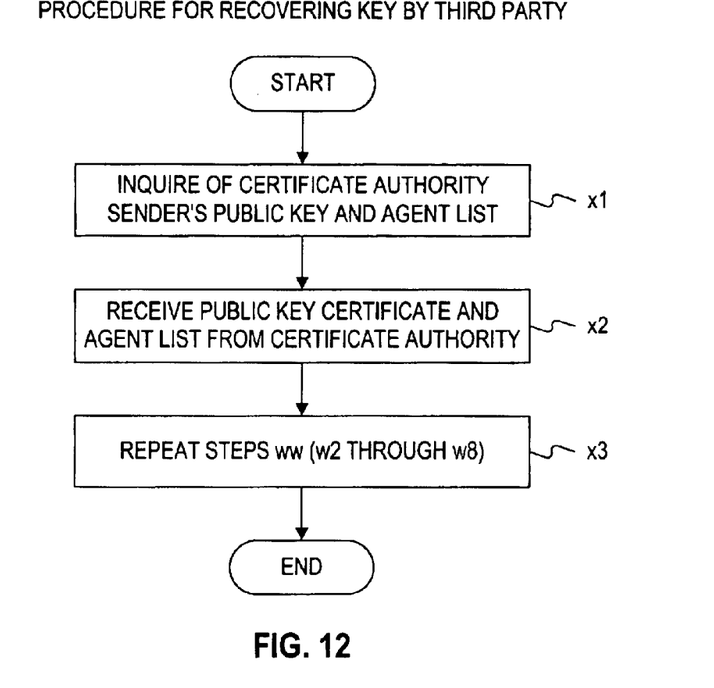
FIG. 12 is a flow chart showing a procedure for recovering a key by a third party.

FIG. 12 is a flow chart showing a procedure for recovering a key by a third party.

In this case, information of the key recovery agent 3 for the key recovery field 33 or 34 contained in the cipher message 31 must be acquired.

The user 1c inquires of the certificate authority 2 the sender's or receiver's public key and the registered key recovery agent list (x1 in FIG. 12).

The certificate authority 2 prepares a sender's or a receiver's public key certificate and registered key recovery agent list certificate from the contents of the registration information table 21 and transmits them to the user 1c. The user 1c receives them (x2 in FIG. 12). This process corresponds to user's operation for finding a telephone number in a telephone directory (registration information table 21) arranged in the certificate authority 2.

The user 1c requests approvals for key recovery to the approvers 4 (p and q in FIG. 1) and sends the approvals together with the key recovery field serving as the recovery target to the key recovery agents 3 and then obtains the recovery pieces (r and s in FIG. 1). The user 1c recovers the session key. This process is the same as in steps ww (w2 through w8) in FIG. 9, and a detailed description thereof will be omitted (X3 in FIG. 2).

(Recovery Procedure of Other Keys)

The recovery of the session key itself contained in cryptographic communication has been described above. Other keys may be recovered using the system of this embodiment. An example of other keys is a private key (user's private key) used by the user 1a, and its recovery process will be described below. In this case, this embodiment serves as a key recovery system.

Figure 13:
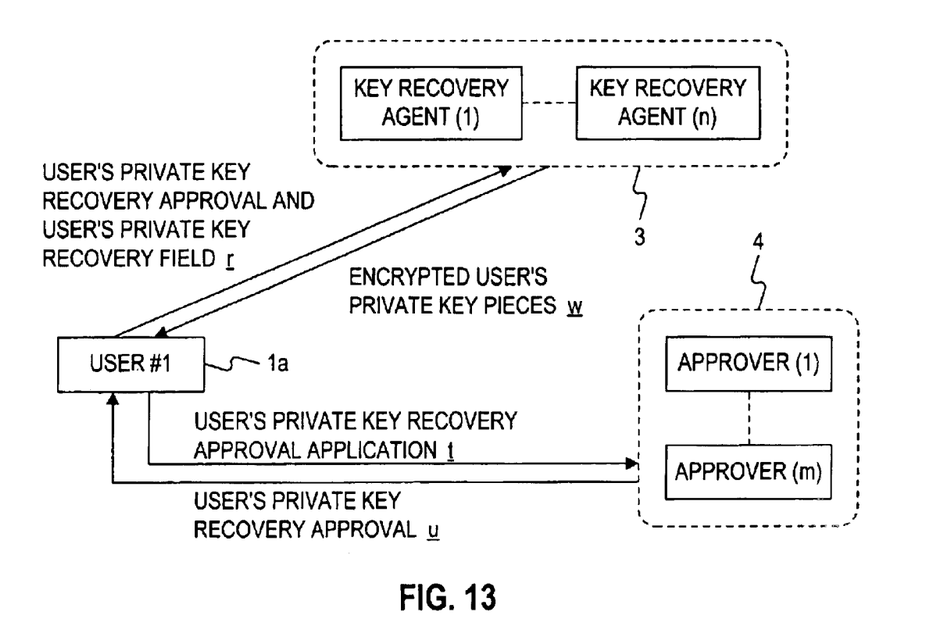
FIG. 13 is a view showing the relationship between the user, key recovery agent, and approver in key recovery.

FIG. 13 is a view showing the relationship between the user, key recovery agent, and approver in key recovery.

The user 1a encrypts its own private key with the public key of the key recovery agent 3 (when the number of registered agents is one) or expands the private key into pieces (when the number of registered agents are many; this will apply to the following description). The user 1a generates user's private key recovery fields obtained by encrypting the respective pieces with the public keys of different key recovery agents and stores them in the memory of the user as the private key backup. Such a user's private key recovery field corresponds to the sender's or receiver's key recovery field.

The user's private key recovery field stores the key recovery agent IDs and data of private keys encrypted with the public keys of the key recovery agents or data of encrypted private key pieces. The number of pairs of storage data is equal to the number of key recovery agents. When a private key is lost or destroyed due to some reason, and the user cannot recover the key, the user 1a sends a user's private key recovery approval application to the approvers 4 (t in FIG. 14). Each approver 4 checks the user's private key recovery approval application and gives its signature (e.g., using a multiple signature scheme). The final approver (representative approver) transmits a user's private key recovery approval to the user 11a (u in FIG. 13).

The user 1a then sends, to each key recovery agent 3, a user' private key recovery approval encrypted with the public key of each key recovery agent, a user's private key recovery field, and an encryption key used to transmit the recovered user's private key or user's private key pieces (v in FIG. 13). Data transmitted at this time is like the one shown in FIG. 11.

Each key recovery agent 3 decrypts the encrypted user's private key recovery approval, user's private key recovery field, and encryption key used to transmit the decrypted user's private key pieces (or user's private key). Each key recovery agent 3 checks the signature of the approver on the user's private key recovery approval. Each key recovery agent recovers the private key pieces (or the entire private key) using the user's private key recovery field and sends, to the user 1a, the private key pieces (or the entire private key) encrypted using the encryption key for private key piece transmission designated by the user (w in FIG. 13).

The user 1a decrypts the encrypted private key pieces (or the entire private key) transmitted from each key recovery agent 3. Upon receiving the key pieces, for example, the Lagrange interpolation formula is used to recover the original private key based on the private key pieces.

As described above, in the cryptographic communication system and encryption apparatus of this embodiment of the present invention, the certificate authority 2 and approvers 4 are arranged in addition to the key recovery agents 3. The rights to key recovery by the key recovery agents can be distributed to improve the safety in key recovery.

In order to prevent concentration of the key recovery function of the key recovery center (certificate authority) and the key recovery agent, at least one approver checks and approves the user registration application, key recovery application, and private key recovery application to the key recovery agent. The approval process using the approver 4 as the third party is introduced in addition to the certificate authority 2 for managing various kinds of information, thereby greatly improving the safety pertaining to key recovery Since each user can selectively register a desired one of a plurality of key recovery agents registered in the certificate authority, highly safe and reliable key recovery can be practiced. Conspiracy between the key recovery agent and malicious third party can be prevented.

Since the registration information table 21 is arranged in the certificate authority 2, so that the information of the table 21 is open to the public, the user can easily inquire registration information to the agent. The key recovery process in cryptographic communication between the users who registers different key recovery agents 3 can be easily performed.

The sender's key recovery field containing information of a key recovery agent registered by the sender and the receiver's key recovery field containing information of a key recovery agent registered by the receiver are generated and transmitted together with the encryption data. The key recovery can be easily performed even if the sender and receiver for data communications are controlled under different key recovery centers.

According to the key recovery system of this embodiment, not only the key information of the session key used for generating cipher data but also the key information of the private key used for key distribution or signature generation can be recovered using a plurality of key recovery agents.

The present invention can be implemented by loading programs, data, and the like stored in a storage medium to a computer. If the storage medium is a computer-readable storage medium which can store programs, the storage format is not limited to a specific one. Examples of the storage medium are a magnetic disk, floppy disk, hard disk, optical disk (e.g., a CD-ROM, CD-R, or DVD), magnetooptical disk (e.g., an MO), and semiconductor memory.

An OS (Operating System) running on the computer on the basis of the instructions from programs installed from the storage medium to the computer and MW (MiddleWare) such as database management software and network software may constitute some of processes for implementing the embodiment.

The storage medium of the present invention is not limited to a medium independent of the computer, but may include a storage medium storing or temporarily storing a downloaded program transmitted via a LAN or Internet.

The number of storage media is not limited to one, but the storage medium of the present invention includes a plurality of storage media which perform the processes of the embodiment.

The computer of the present invention is to execute processes of the embodiment on the basis of programs stored in the storage medium. The computer may be a single apparatus such as a personal computer or a system in which a plurality of apparatuses are connected via a network.

The computer of the present invention is not limited to a personal computer, but includes a microcomputer and an arithmetic processing device included in an information processing apparatus. The computer is a representative of the apparatuses and devices capable of performing the functions of the present invention by programs.

As has been described above, according to the present invention, there can be provided a cryptographic communication system and key recovery system capable of preventing concentration of rights pertaining to key decryption and conspiracy between the agents, and improving the safety in key recovery.

According to the present invention, there is provided an encryption apparatus, cryptographic communication system, key recovery system, and storage medium, in which in cryptographic communications between users who register different agents, each user or authentic third party can easily acquire the agent information and recover the key.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cryptographic communication system comprising:

an encryption apparatus for encrypting a data body and for transmitting transmission data to a receiver, the transmission data including:

an encrypted data body;

sender's key recovery data obtained by encrypting recovery information for recovering a key for decrypting the encrypted data body to allow a key recovery agent registered by a sender to decrypt the recovery information; and receiver's key recovery data obtained by encrypting the recovery information for recovering the key for decrypting the encrypted data body to allow the key recovery agent registered by the receiver to decrypt the recovery information;

a plurality of the key recovery agents each, when registered by the sender or the receiver, capable of decrypting a sender's or a receiver's key comprised of a plurality of key pieces obtained by dividing the key into pieces, wherein each key recovery agent decrypts and sends back the sender's or the receiver's key recovery data only when a request is made by a party approved by an approver; and an approver apparatus for approving a requester for a key recovery agent registration approval and approving an authorized third party, who requests an approval for decrypting the sender's or the receiver's key recovery data, to decrypt the senders or the receiver's key recovery data.

2. A cryptographic communication system comprising:

an encryption apparatus for encrypting a data body and for transmitting transmission data to a receiver, the transmission data including:

an encrypted data body;

sender's key recovery data obtained by encrypting recovery information for recovering a key for decrypting the encrypted data body to allow a key recovery agent registered by a sender to decrypt the recovery information; and receivers key recovery data obtained by encrypting the recovery information for recovering the key for decrypting the encrypted data body to allow the key recovery agent registered by the receiver to decrypt the recovery information;

a plurality of the key recovery agents each, when registered by the sender or the receiver, capable of decrypting a sender's or a receiver's key comprised of a plurality of key pieces obtained by dividing the key into pieces, wherein each key recovery agent decrypts and sends back the sender's or the receiver's key recovery data only when a request is made by a party approved by an approver;

a certificate authority apparatus arranged to allow accepting registration of at least the key recovery agent and receivers and provide information representing correspondence between each registered receiver and the key recovery agent and information representing that said encryption apparatus encrypts the recovery information so as to allow the key recovery agent to decrypt the recovery information; and an approver apparatus for approving a requester for a key recovery agent registration approval and approving an authorized third party, who requests an approval for decrypting the sender's or the receiver's key recovery data, to decrypt the sender's or the receiver's key recovery data.

3. A cryptographic communication method comprising:

encrypting a data body;

transmitting transmission data to a receiver, the transmission data including:

an encrypted data body;

sender's key recovery data obtained by encrypting recovery information for recovering a key for decrypting the encrypted data body to allow a key recovery agent registered by a sender to decrypt the recovery information; and receivers key recovery data obtained by encrypting the recovery information for recovering the key for decrypting the encrypted data body to allow the key recovery agent registered by the receiver to decrypt the recovery information; and decrypting, by each of a plurality of key recovery agents, when registered by the sender or the receiver, a sender's or a receiver's key comprised of a plurality of key pieces obtained by dividing the key into pieces; and approving, by an approving apparatus, a requester for a key recovery agent registration approval and approving an authorized third party, who requests an approval for decrypting the sender's or the receiver's key recovery data, to decrypt the sender's or the receivers key recovery data wherein the sender's or the receiver's key recovery data sent only when a request is made by a party approved by an approver.

4. A cryptographic communication method, comprising:

encrypting a data body;

transmitting transmission data to a receiver, the transmission data including:

an encrypted data body;

sender's key recovery data obtained by encrypting recovery information for recovering a key for decrypting the encrypted data body to allow a key recovery agent registered by a sender to decrypt the recovery information; and receiver's key recovery data obtained by encrypting the recovery information for recovering the key for decrypting the encrypted data body to allow the key recovery agent registered by the receiver to decrypt the recovery information;

decrypting, by each of a plurality of the key recovery agents, when registered by the sender or the receiver, a sender's or a receiver's key comprised of a plurality of key pieces obtained by dividing the key into pieces;

accepting a registration of at least the key recovery agent and receivers and providing information representing correspondence between each registered receiver and the key recovery agent and information representing that said encryption apparatus encrypts the recovery information so as to allow the key recovery agent to decrypt the recovery information;

approving a requester for a key recovery agent registration approval and approving an authorized third party, who requests an approval for decrypting the sender's or the receivers key recovery data, to decrypt the sender's or the receiver's key recovery data; and said decrypting and sending the sender's or receiver's key recovery data is made only when a request is made by a party approved by an approver.

5. An article of manufacture comprising:

a computer usable medium having computer readable program code means embodied therein for facilitating a cryptographic communication method, the computer readable program code means further comprising:

means for causing a computer to encrypt a data body;

means for causing the computer to transmit transmission data to a receiver, the transmission data including:

an encrypted data body;

sender's key recovery data obtained by encrypting recovery information for recovering a key for decrypting the encrypted data body to allow a key recovery agent registered by a sender to decrypt the recovery information; and receiver's key recovery data obtained by encrypting the recovery information for recovering the key for decrypting the encrypted data body to allow a key recovery agent registered by a receiver to decrypt the recovery information; and means for causing the computer to decrypt, by each of a plurality of key recovery agents, when registered by a sender or a receiver, senders or receivers key comprised of a plurality of key pieces obtained by dividing the key into pieces;

means for causing the computer to approve, by an approving apparatus, a requester for a key recovery agent registration approval and approving an authorized third party, who requests an approval for decrypting the sender's or the receiver's key recovery data, to decrypt the sender's or the receiver's key recovery data, and means for causing the computer to decrypt and send the sender's or the receiver's key recovery data only when a request is made by a party approved by an approver.

6. An article of manufacture comprising:

a computer usable medium having computer readable program code means embodied therein for facilitating a cryptographic communication method, the computer readable program code means further comprising:

means for causing a computer to encrypt a data body;

means for causing the computer to transmit transmission data to a receiver, the transmission data including:

means for causing the computer to include into the transmission data:

an encrypted data body;

sender's key recovery data obtained by encrypting recovery information for recovering a key for decrypting an encrypted data body to allow a key recovery agent registered by a sender to decrypt the recovery information; and receiver's key recovery data obtained by encrypting the recovery information for recovering the key for decrypting the encrypted data body to allow the key recovery agent registered by a receiver to decrypt the recovery information; and means for causing the computer to decrypt, by each of a plurality of key recovery agents, when registered by sender or receiver, senders or receivers key comprised of a plurality of key pieces obtained by dividing the key into pieces;

means for causing the computer to accept a registration of at least the key recovery agent and receivers and provide information representing correspondence between each registered receiver and the key recovery agent and information representing that said encryption apparatus encrypts the recovery information so as to allow the key recovery agent to decrypt the recovery information;

means for causing the computer to approve a requester for the key recovery agent registration approval and approving an authorized third party, who requests an approval for decrypting the sender's or the receiver's key recovery data, to decrypt the sender's or the receiver's key recovery data; and means for causing the computer to decrypt and send back the sender's or the receiver's key recovery data only when a request is made by a party approved by an approver.

* * * * *

UNITED STATES PATENT AND TRADEMARK OFFICE
CERTIFICATE OF CORRECTION

PATENT NO. : 6,842,523 B2
DATED : January 11, 2005
INVENTOR(S) : Niwa et al.

It is certified that error appears in the above-identified patent and that said Letters Patent is hereby corrected as shown below:

Column 11,
Line 48, change "senders" to -- sender's --.
Line 61, change "receivers" to -- receiver's --.

Column 12,
Line 28, after "information" delete the line break.
Line 30, after "key" delete the line break.
Lines 33 and 46, change "receivers" to -- receiver's --.
Line 48, change "data sent" to -- data is sent --.

Column 13,
Line 13, change "receivers" to -- receiver's --.
Line 41, change "senders or receivers" to -- sender's or receiver's --.

Column 14,
Line 27, change "senders or receivers" to -- sender's or receiver's --.

Signed and Sealed this

Third Day of May, 2005

JON W. DUDAS
*Director of the United States Patent and Trademark Office*